No. 650,243. Patented May 22, 1900.
T. W. HART.
GIG SADDLE.
(Application filed Apr. 18, 1899.)
(No Model.)
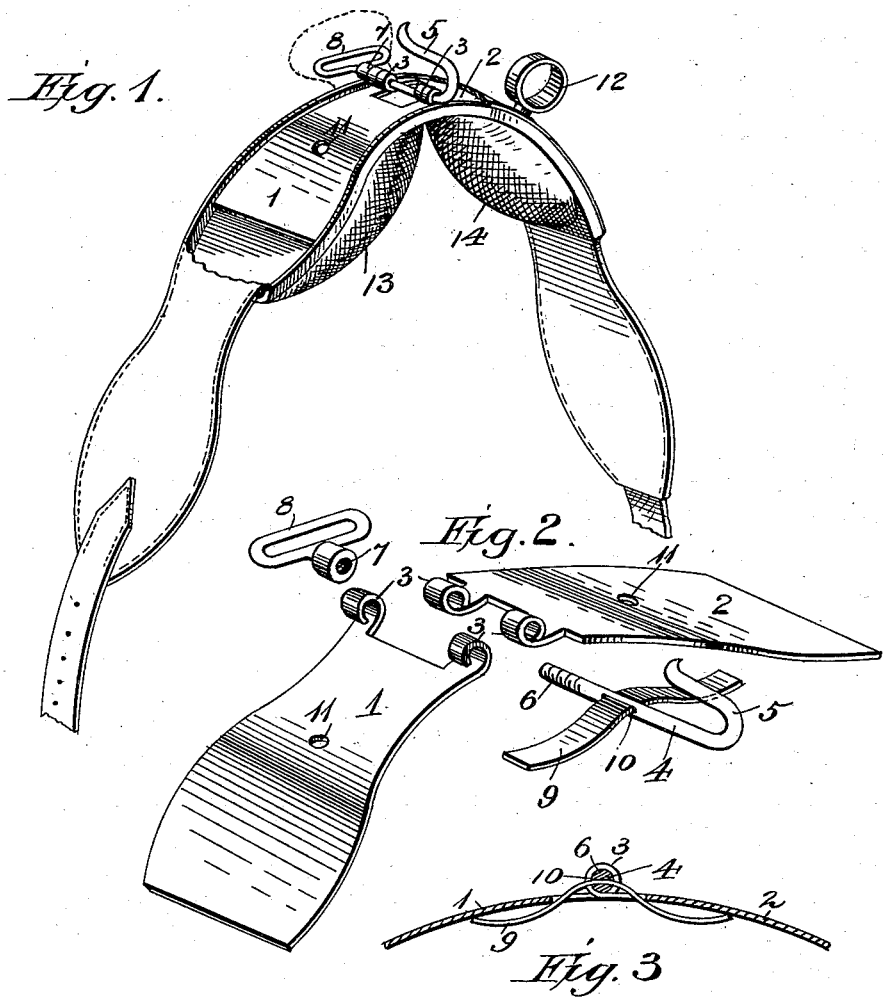

UNITED STATES PATENT OFFICE.

THOMAS W. HART, OF MEMPHIS, TENNESSEE.

GIG-SADDLE.

SPECIFICATION forming part of Letters Patent No. 650,243, dated May 22, 1900.

Application filed April 18, 1899. Serial No. 713,475. (No model.)

*To all whom it may concern:*

Be it known that I, THOMAS W. HART, a citizen of the United States, residing at Memphis, in the county of Shelby and State of Tennessee, have invented certain new and useful Improvements in Gig-Saddles; and I do hereby declare the following to be a full, clear, and exact description of the invention, such as will enable others skilled in the art to which it appertains to make and use the same.

My invention, as will be hereinafter fully described and claimed, relates to certain new and useful improvements in harness, and more particularly to what is termed a "gig-saddle;" and the object of my invention is to provide a flexibility for the upper portion of the back-band, which will enable the upper part of the harness to always snugly conform to the shape of the animal whether the animal be plump and round or in an emaciated condition. By providing a flexibility for this portion of the harness instead of making such part rigid, as is usual, the padded side of the gig-saddle will rest upon the back of the animal instead of permitting the weight to rest upon the backbone of the animal, and thereby causing an abrasion and a resultant sore.

The details of my invention will be illustrated in the accompanying drawings, in which—

Figure 1 is a perspective view of my improved gig-saddle complete covered in the usual manner with leather and supplied with the usual cushions or pads upon its under side. Fig. 2 is a perspective detail showing the several parts forming the interior portion of my gig-saddle separated from each other. Fig. 3 is a transverse section of the parts shown in Fig. 2 after they have been assembled in their respective operative positions.

Referring to the several parts of my invention and their coöperating accessories by designating-numerals, 1 and 2 are plates forming the body-section of my gig-saddle, which are hinged together at their inner ends by means of the curved terminals 3, said terminals being so adjusted with respect to each other that they will preferably interlace with each other and when brought in true alinement are held in such position by inserting the stem 4 through the curved terminals 3.

The stem 4 is provided at its forward end with the usual or other preferred form of water-hook 5, while its rear end is provided with the threaded terminal 6, adapted to be received by the threaded socket 7, formed upon or carried by the eyelet 8, which is designed to provide means for connecting the forward end of the back-strap to the gig-saddle.

In order to hold the outer ends of the plates 1 and 2 disposed normally upward, I provide the spring-support 9, which is preferably held in position by passing it through a suitable slot 10, formed in the stem 4, it being understood that by this arrangement the free ends of said spring are brought into close contact with the under side of the plates 1 and 2, thereby tending to elevate the outer ends of said plates, though permitting the gig-saddle to readily conform to the back of the animal.

It will be understood that when the several parts just described are assembled in their respective operative positions they may be covered and thereby hidden from view by leather or otherwise and that when so covered holes may be provided in said outer covering coinciding in position with the threaded apertures 11, which are designed to receive the threaded stems of the terret-rings 12, usually employed upon gig-saddles for the reception of the driving-reins.

Suitable cushions or pads 13 and 14 may be secured in the usual way upon the under side of the covering employed to house the plates 1 and 2, and owing to the hinged connection between said plates they will permit the pads 13 and 14 to readily conform to the back of the animal, and thereby prevent the weight thereof from resting mainly upon one point and thereby injuring the animal.

By the arrangement I have herein illustrated and described it will be clear that my gig-saddle when thus provided with the interior parts will have the capacity to readily yield or conform to the shape of the back of the animal and will therefore adjust itself so as to result in no injury, inasmuch as the weight will be evenly distributed and will not rest with undue severity upon one point, as would be the case if the saddle were rigid. If, for instance, the saddle were rigid, the backbone of the animal, if poor and emaciated, would extend upward in contact with the middle portion of the saddle and would thus receive the entire weight thereof.

It will be seen that the several interior parts of my improved saddle may be very cheaply made and that said parts may be covered in the usual manner and the complete saddle produced ready for use at no greater cost than for saddles as now ordinarily constructed.

Believing that the advantages and construction of my improved gig-saddle will be fully apparent from the foregoing specification, I deem further reference to the details thereof unnecessary.

What I claim as new, and desire to secure by Letters Patent, is—

1. The herein-described gig-saddle consisting of body sections or members; suitable means to pivotally secure said parts together; a water-hook having a stem extending into coöperative relationship with said hinged portion and provided with a securing-socket having an eylet-ring, and a spring-support carried by said stem and so disposed that the free ends thereof will bear upon the under side of each of said body-sections, as specified and for the purpose set forth.

2. As an improvement in gig-saddles, a pair of plates constituting the body of the saddle in combination with a water-hook designed to pivotally hold said parts together and having a slot near its central portion, a spring passing through said slot and so disposed that the free ends thereof will bear against the under side of said plates and a socket having a loop adapted to fit the rear end of said water-hook and thereby hold the same in its operative position, all combined as set forth.

3. As an improvement in gig-saddles, a pair of plates constituting the body of the saddle and a water-hook adapted to pivotally secure said plates together, said hook having a slot near its central portion and a spring extending through said slot and bearing against said plates whereby said plates will be held normally upward, substantially as specified and for the purpose set forth.

In testimony whereof I affix my signature in presence of two witnesses.

THOMAS W. HART.

Witnesses:
W. C. DUTTLINGER,
C. H. STRAND.